April 6, 1926.

J. H. BLAIR

POWER TRANSMISSION

Filed April 28, 1924

1,579,433

3 Sheets-Sheet 1

INVENTOR
JOHN H. BLAIR
BY
ATTORNEYS

April 6, 1926.

J. H. BLAIR

POWER TRANSMISSION

Filed April 28, 1924

1,579,433

3 Sheets-Sheet 2

INVENTOR
JOHN H. BLAIR.

BY

ATTORNEYS.

INVENTOR
JOHN H. BLAIR.
BY
ATTORNEYS.

Patented Apr. 6, 1926.

1,579,433

UNITED STATES PATENT OFFICE.

JOHN H. BLAIR, OF SAN FRANCISCO, CALIFORNIA.

POWER TRANSMISSION.

Application filed April 28, 1924. Serial No. 709,655.

*To all whom it may concern:*

Be it known that I, JOHN H. BLAIR, a citizen of the United States, and a resident of San Francisco, county of San Francisco, and State of California, have invented a new and useful Power Transmission, of which the following is a specification.

The present invention relates to improvements in power transmissions, and its particular object is to provide means whereby power can be transmitted from one rotary element to a second rotary element at a changed speed ratio.

It is particularly proposed to provide a transmission in which motion may be transmitted from one shaft to a second shaft at either the same speed or at a different speed without the necessity of shifting any gears. While the arrangement to be described in this specification allows of one change only, different changes may be obtained by using a plurality of units. As a particular advantage of my transmission might be mentioned the fact that it includes a frictional engagement allowing a change in speeds to be brought about without any clutch shifting. Further objects and advantages of my arrangement will appear as the specification proceeds.

Figure 1:
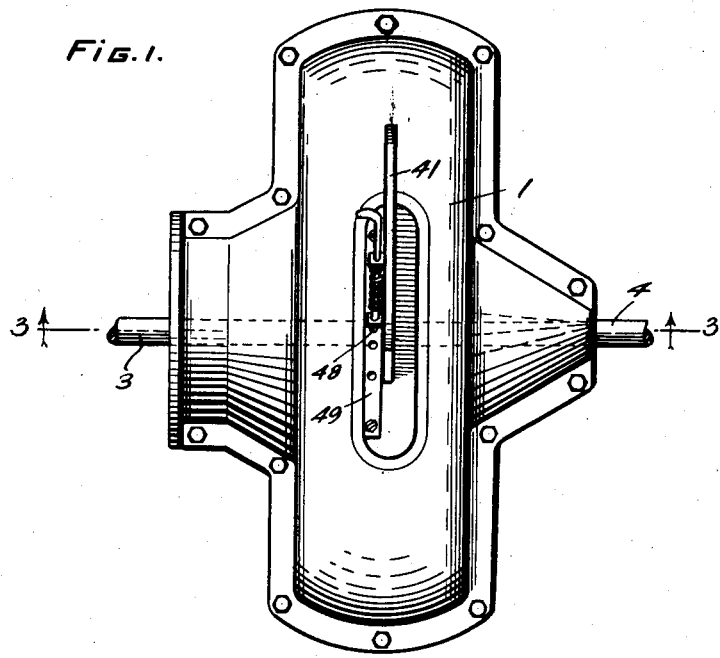
Figure 2:
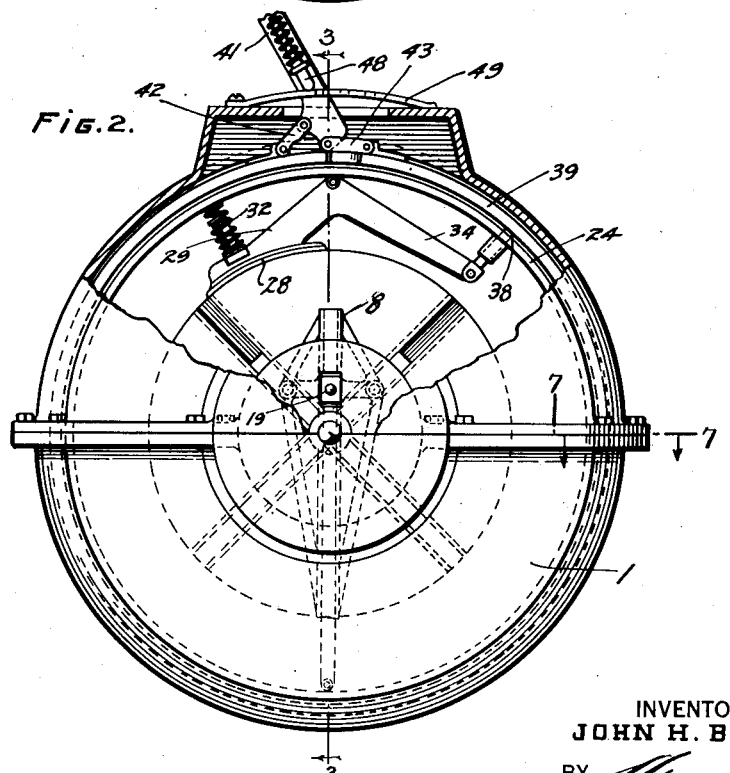
Figure 3:
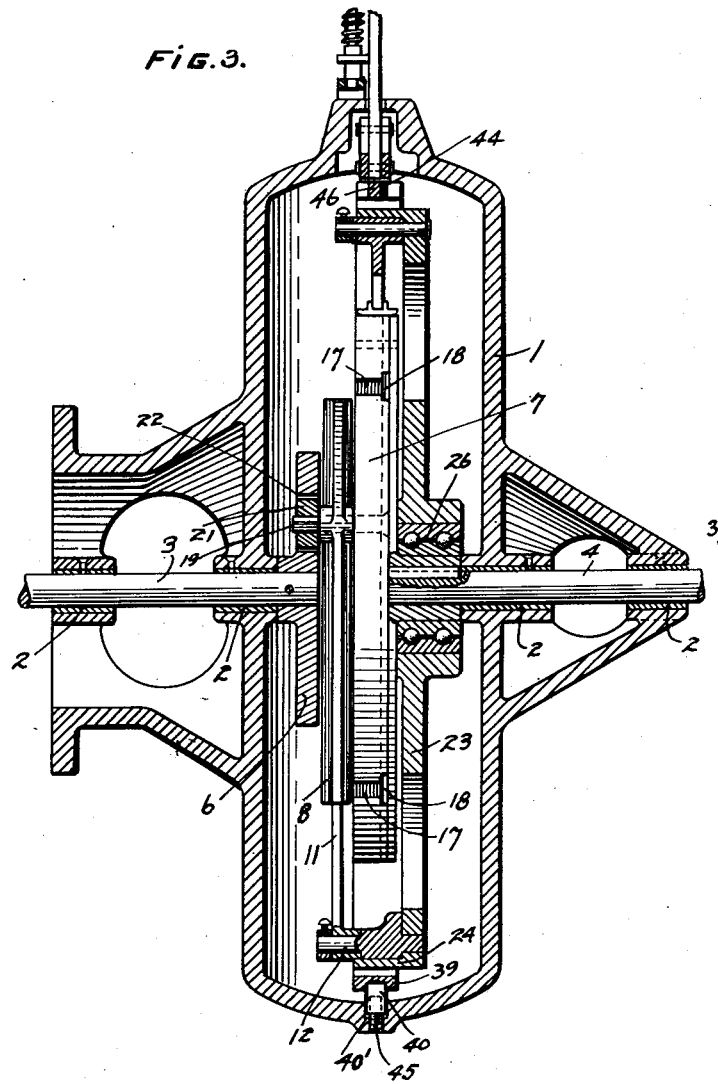
Figure 6:
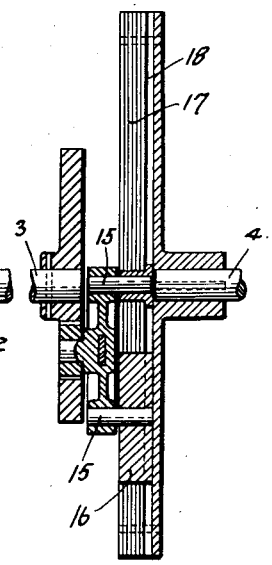
Figure 7:
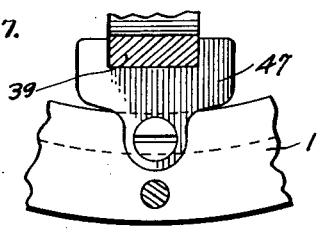
Figure 4:
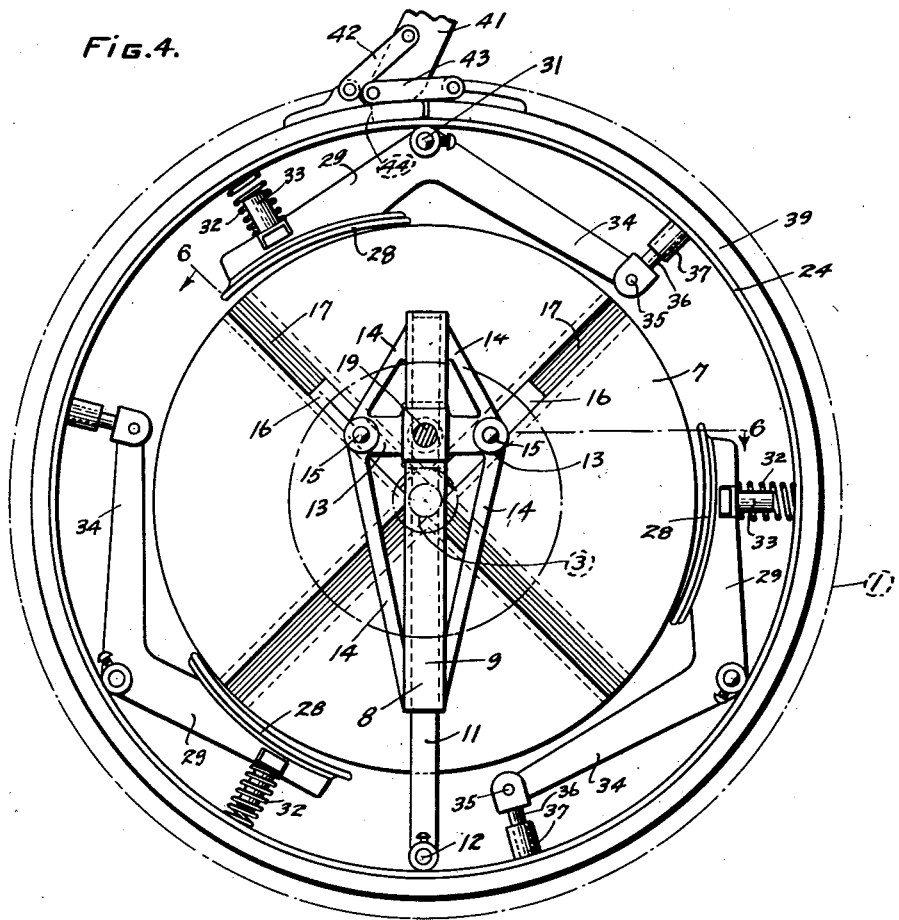
Figure 5:
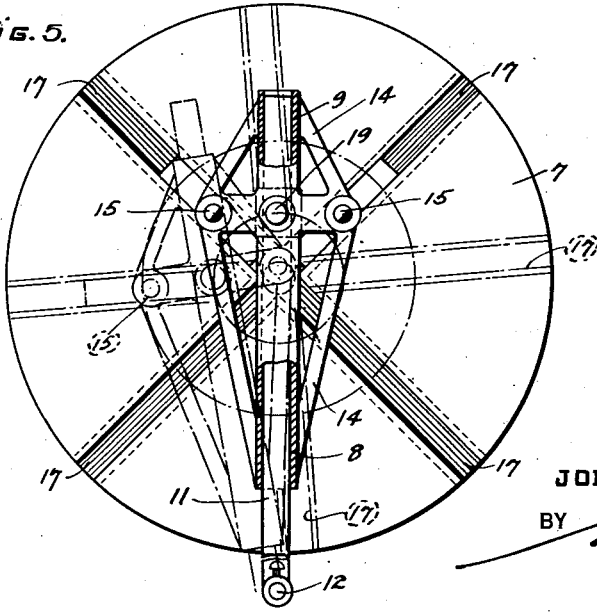

The preferred form of my transmission is illustrated in the accompanying drawing, in which Figure 1 shows a top plan view of my device, Figure 2 a side view with portions broken away to disclose the interior, Figure 3 a vertical section taken along line 3—3 of Figure 1, Figure 4 a side view of the working mechanism detached from the housing, Figure 5 a detail view explaining the operation of a mechanism for bringing about a speed ratio of one to two, Figure 6 a detail sectional view taken along line 6—6 of Figure 4, and Figure 7 a detail sectional view taken along line 7—7 of Figure 2. While I have shown only the preferred form of the invention, I wish to have it understood that various changes or modifications may be made within the scope of the claims hereto attached without departing from the spirit of the invention.

The housing (1) for my transmission, which may be of any suitable form in accordance with the requirements in each case, provides bearings (2) for the two shafts (3) and (4) which are disposed in axial alinement with one another. The shaft (3) has fixed thereto a disk wheel (6), while the shaft (4) has a larger disk wheel (7) disposed thereon, the two disk wheels being thus mounted in confronting relation and leaving between the same a space adapted to accommodate the slide (8) which engages with both disk wheels for the purpose of transmitting rotary motion from one to the other at a speed ratio of one to two.

The slide (8) is preferably made in the form of a cross with a hollow stem (9) adapted to slide on the bar (11) which latter is pivoted to a pin (12) disposed on the outside of the two disks and with the two arms (13) braced to the stem by the members (14). The pivot (12) may for the present be considered stationary.

The two arms of the cross have pivotally connected thereto by means of pins (15) two blocks (16) arranged to ride in two diametrical grooves (17) in the disk (7), the two grooves being arranged at right angles to one another and the blocks and the grooves being preferably formed T shaped as shown at (18) to prevent the blocks from leaving the grooves except by endwise motion. The two blocks are adapted to travel each in its groove and are made of such length that when the disk (7) is rotated one of them while retreating in its groove allows the other to pass the center of the disk.

The slide is pivoted by means of a pin (19) extending from its point of intersection to the small disk (6) so as to cause the latter disk to partake of the rotary motion of the intersecting point of the cross. Instead of engaging with the disk (6) directly, the pin (19) is preferably engaged with a block (21) held in a radial slot (22) of the disk with limited freedom of sliding motion.

This arrangement serves to transmit rotary motion from the disk (7) to the disk (6) at a speed ratio of one to two, as will be readily seen by referring to Figure 5. In this figure the cross-shaped slide is shown in full lines in one position and in dotted lines in a position occupied by the same after the disk has made an eighth of a revolution. It will be seen that while the disk (7) has made only one-eight of a revolution, the pin (19), representing the point of intersection of the cross, has made a quarter of a revolution, and since this pin is the actuating member for the smaller disk (6) the latter has necessarily made a quarter of a revolution. As long as the pin (12) is held stationary the slide (8) will therefore transmit motion from the disk (7) to the disk (6) at a one to two ratio.

The pin (12) is secured to the web (23) of a drum (24) near the periphery thereof, the web being rotatable on the shaft (4) with ball bearings (26) providing against friction. The drum (24) is ordinarily made to rotate with the disk (7) by means of the shoes (28) secured to one arm of the levers (29) which latter are pivoted to the web of the drum as shown at (31).

Springs (32) interposed between the shoe and the internal face of the drum and guided by pins (33) normally engage the shoe with the disc (7). The free arm (34) of each lever (29) has a pin (36) pivoted thereto as shown at (35) and the pins extend through guide sleeves (37) and perforations (38) in the drum so as to normally project beyond the latter. When in this position the drum rotates with the disk (7) on account of the action of the springs (32) on the shoes (28) and since the pin (12) is a part of the drum, it rotates with the same, holding the slide (8) in a definite position relative to the disk (7) whereby both disks are tied into one unit and caused to rotate at the same speed.

In order to allow of transmission of motion from one disk to the other at a one to two speed ratio it is necessary to render the pin (12) stationary, and this is done by means of the brake band (39) surrounding the drum (24) and adapted to be tightened upon the same by means of the lever (41) engaging two pairs of links (42) and (43) in such a manner that manipulation of the free end of the lever will draw the two ends of the brake band together.

The ends of the brake band are preferably made so that a tongue (44) of one end remains in engagement with a groove (46) in the other end even while the brake band is released so that there never is an actual gap between the two ends. The brake band is furthermore guided by clips (47) secured to the housing at suitable places and is held against rotation by means of a pin (40) held in a recess (40') in the housing by means of a screw (45).

The lever (41) may be held in a brake band applying position by means of a spring actuated plunger (48) adapted to be engaged with a stationary element (49).

The operation of the device should be readily understood from the foregoing description. When the brake band is released the drum (24) is fixed to the disk (7) by means of the brake shoes (28) and causes the pin (12) to rotate with the drum, which prevents any motion of the slide (8) relative to the disk (7) and thereby ties the two disks into one unit, causing the same to rotate at the same rate of speed.

When the brake band is tightened the shoes are forced away from the disk (7) by the brake band forcing the projecting ends of the pins (36) inwardly and at the same time the drum is held against rotation by the brake band. The pin (12) now becomes stationary and the rotating disk (7) causes the block (16) to ride back and forth in the groove (17) thereby reciprocating the slide (8) on the bar (11) and at the same time causing the pin (19) to rotate around the axis of the two disks at a speed ratio of one to two. The pin (19) engaging the small disk (6) causes the same to rotate at the same speed.

I claim:

1. In a transmission, a revolving wheel formed with diametrical transverse grooves in the face thereof, a second wheel mounted coaxially therewith and means for transmitting motion from the first wheel to the second wheel at a different rate of speed comprising a pivoted element, a slide thereon having blocks pivoted thereto in spaced relation arranged to slide in the transverse grooves of the transmitting wheel and a pivotal connection between the slide and the second wheel.

2. In a transmission, means for transmitting rotary motion from a revolving wheel to a second wheel mounted coaxially therewith comprising a pivoted element extending into the space between the two wheels with its loose end having a slide thereon operatively engaging both wheels for transmitting motion from one to the other at a changed speed ratio.

3. In a transmission, a transmitting wheel formed with diametrical transverse grooves in the face thereof, a driven wheel mounted coaxially therewith, a stationarily pivoted bar, a cross having a hollow stem slidable thereon, blocks pivoted to the arms of the cross slidable in the transverse grooves in the transmitting wheel and a pivotal connection between the point of intersection of the cross and the driven wheel.

JOHN H. BLAIR.